United States Patent  (10) Patent No.: US 9,088,780 B2
Kim et al.  (45) Date of Patent: Jul. 21, 2015

(54) METHOD OF ADAPTIVE INTRA PREDICTION MODE ENCODING AND APPARATUS FOR THE SAME, AND METHOD OF ENCODING AND APPARATUS FOR THE SAME

(71) Applicant: INDUSTRY-ACADEMIC COOPERATION FOUNDATION, YONSEI UNIVERSITY, Seoul (KR)

(72) Inventors: Min Sil Kim, Sokcho (KR); Yoon Sik Choe, Goyang (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 379 days.

(21) Appl. No.: 13/712,717

(22) Filed: Dec. 12, 2012

(65) Prior Publication Data

US 2013/0170546 A1    Jul. 4, 2013

Related U.S. Application Data

(60) Provisional application No. 61/580,896, filed on Dec. 28, 2011.

(30) Foreign Application Priority Data

Dec. 13, 2011   (KR) .......................... 10-2011-0133864

(51) Int. Cl.
| | |
|---|---|
| *H04N 19/00* | (2014.01) |
| *H04N 19/50* | (2014.01) |
| *H04N 19/159* | (2014.01) |
| *H04N 19/176* | (2014.01) |
| *H04N 19/11* | (2014.01) |
| *H04N 19/196* | (2014.01) |

(52) U.S. Cl.
CPC ......... *H04N 19/00569* (2013.01); *H04N 19/11* (2014.11); *H04N 19/159* (2014.11); *H04N 19/176* (2014.11); *H04N 19/198* (2014.11)

(58) Field of Classification Search
CPC ....................................................... H04N 19/11
USPC ..................................................... 375/240.12
See application file for complete search history.

(56) References Cited

U.S. PATENT DOCUMENTS

| | | | | |
|---|---|---|---|---|
| 2009/0147855 | A1* | 6/2009 | Song et al. ............... | 375/240.16 |
| 2011/0142132 | A1* | 6/2011 | Tourapis et al. ......... | 375/240.16 |
| 2013/0114707 | A1* | 5/2013 | Seregin et al. ........... | 375/240.12 |

FOREIGN PATENT DOCUMENTS

KR    10-2009-0052706 A    5/2009

* cited by examiner

*Primary Examiner* — Sath V Perungavoor
*Assistant Examiner* — Jeffery Williams

(57) ABSTRACT

Disclosed are a method and an apparatus for intra prediction mode encoding that may increase compression efficiency of intra prediction mode encoding. The intra prediction mode encoding method may include detecting a similarity of a prediction direction of a neighbor block with respect to a current block based on a position of the neighbor block and an intra prediction direction of the neighbor block with respect to the current block, and determining a candidate prediction mode of the current block based on the similarity and the number of candidate intra prediction modes (N). Accordingly, intra encoding performance of an image may be improved by more accurately and efficiently compressing information about an intra prediction mode of a current block by considering local statistics, which is different from a related art in which only global statistics are considered.

16 Claims, 8 Drawing Sheets

'Prior Art'

'Prior Art'

METHOD OF ADAPTIVE INTRA PREDICTION MODE ENCODING AND APPARATUS FOR THE SAME, AND METHOD OF ENCODING AND APPARATUS FOR THE SAME

CROSS-REFERENCE TO RELATED APPLICATIONS

This application claims priorities to and the benefits of Korean Patent Application No. 10-2011-0133864, filed in the Korean Intellectual Property Office on Dec. 13, 2011 and U.S. Provisional Patent Application No. 61/580,896, filed in the United States Patent and Trademark Office on Dec. 28, 2011, the entire contents of which are incorporated herein by reference.

TECHNICAL FIELD

The present invention relates to a method and an apparatus for adaptive intra prediction mode encoding, and a decoding method and apparatus for the same, and more particularly, to a method and an apparatus that may increase compression efficiency of intra prediction mode encoding and decoding.

BACKGROUND ART

The present invention relates to a method and an apparatus for adaptive intra prediction mode encoding, and a decoding method and apparatus for the same, and more particularly, to a method and an apparatus that may increase compression efficiency of intra prediction mode encoding and decoding.

In order to encode an image, an image compression scheme such as an H.264/advanced video coding (AVC) scheme may divide a single picture into a plurality of macro blocks and may encode each macro block using intra prediction.

Intra prediction calculates a prediction value of a current block desired to be encoded by referring to a pixel value that is spatially adjacent to a target block desired to be encoded within a current picture and then encodes the current block by performing discrete cosine transform (DCT) and quantization with respect to a difference between the prediction value and a pixel value of the current block. Here, a variety of intra prediction modes are present to predict the pixel value of the current block and are generally divided into a (4×4) intra prediction mode, an (8×8) intra prediction mode, and a (16×16) intra prediction mode of a luminance component, and an intra prediction mode of a chrominance component. The (4×4) intra prediction mode of the H.264/AVC scheme may have nine prediction modes for intra prediction.

The nine intra prediction modes have mode numbers of "0" to "8", respectively, based on a statistical usage frequency. Usually, a number "0" mode has the largest statistical usage frequency and a number "8" mode has the lowest statistical usage frequency.

FIG. 1 is a conceptual diagram illustrating positions of a current block and a neighbor block.

Referring to FIG. 1, in the H.264/AVC scheme, information about an intra prediction direction of a current block 100 is encoded by referring to an intra prediction direction of an upper block 101 positioned above the current block 100 and an intra prediction direction of a left block 103 positioned on the left side of the current block 100. An operation of encoding the upper block 101 and the left block 103 may be completed prior to an operation of encoding the current block 100 whereby each of the upper block 101 and the left block 103 may have information about the intra prediction direction. Decoding may be completed prior to an operation of decoding the current block and thus, a reception side may refer to information about the intra prediction direction.

Initially, an intra prediction mode number of the current block 100 is determined based on rate-distortion (RD) cost. Next, a minimum value between intra prediction mode numbers of the upper block 101 and the left block 103 is defined as a candidate prediction mode (most probable mode (MPM)) and is compared with the intra prediction mode number of the current block 100. Since a number of "0" to "8" is allocated to the intra prediction mode number based on the statistical usage frequency, a probability that the minimum value among intra prediction mode numbers of neighbor blocks matches the intra prediction mode number of the current block is high.

An image compression scheme such as a high efficiency video coding (HEVC) scheme determines an intra prediction mode of a current block using 35 intra prediction modes and two MPMs, which is different from the H.264/AVC scheme that uses nine intra prediction modes and a single MPM.

FIG. 2 is an exemplary diagram of 35 intra prediction modes of the HEVC scheme.

Initially, the HEVC scheme determines an intra prediction mode number of the current block 100 among 35 intra prediction modes of FIG. 2 based on RD cost, which is similar to the H.264/AVC scheme, and defines the minimum value among intra prediction mode numbers of the upper block 101 and the left block 103 as a lower index of MPM, that is, MPM[0] and a maximum value as an upper index of MPM, that is, MPM[1]. Next, the above MPM[0] and MPM[1] are compared with an intra prediction mode number of the current block. A number of "0" to "34", starting from a high frequency number, is allocated to the intra prediction mode number based on a statistical usage frequency.

Referring again to FIG. 1, in the intra prediction mode of the HEVC scheme, two MPMs are defined to have the minimum value and the maximum value among the intra prediction mode numbers using the upper block 101 and the left block 103. Therefore, only global statistics are considered and local statistics are not considered.

PRIOR ART DOCUMENT

Patent Document 1: Korean Patent Publication No. 10-2009-0052706 ("Method of determining an intra mode of a macro block in image encoding", Hanyang University Industry-University Cooperation Foundation, published on May 26, 2009)

SUMMARY OF THE INVENTION

As described above, in a conventional intra prediction mode, only global statistics are considered and local statistics are not considered. That is, since an intra prediction mode of a neighbor block is simply used as is, a similarity of prediction directivity into the current block based on a position and directivity of the neighbor block is not considered. Accordingly, there is a need for a method and an apparatus for intra prediction mode encoding that may consider a similarity of predicted directivity between neighbor blocks to be referred to and the current block, and may compress intra prediction information about the current block with an accurate and high probability by effectively employing the considered similarity.

An aspect of the present invention provides an intra prediction mode encoding method that may determine a continuity and a similarity of a prediction direction that a position and a prediction direction of a neighbor block affect a current block within a screen, and may increase compression efficiency of intra prediction mode encoding by employing the determined continuity and similarity to determine a candidate prediction mode of the current block.

Also, another aspect of the present invention also provides an intra prediction mode encoding apparatus that may determine a continuity and a similarity of a prediction direction that a position and a prediction direction of a neighbor block affect a current block within a screen, and may increase compression efficiency of intra prediction mode encoding by employing the determined continuity and similarity to determine a candidate prediction mode of the current block.

An exemplary embodiment of the present invention provides a method for encoding an intra prediction mode, the method including: detecting a similarity of a prediction direction of a neighbor block with respect to a current block based on a position of the neighbor block and an intra prediction direction of the neighbor block with respect to the current block; and determining a candidate prediction mode of the current block based on the similarity and the number of candidate intra prediction modes (N). Here, the intra prediction mode encoding method may further include determining the intra prediction direction of the neighbor block adjacent to the current block. Also, the number of candidate intra prediction modes (N) may be greater than or equal to "3". Here, the neighbor block may include a left block and an upper block based on the current block. Alternatively, the neighbor block may include a left block, an upper left block, an upper block, an upper right block, and a lower left block based on the current block. Here, the detecting of the similarity may detect the similarity of the prediction direction of the neighbor block with respect to the current block based on a width of an overlapping area with the current block when extending the neighbor block along the intra prediction direction of the neighbor block from the position of the neighbor block. Also, the candidate prediction mode may include the number of indices corresponding to the number of candidate intra prediction modes (N), and the determining of the candidate prediction mode of the current block may allocate a prediction direction of the neighbor block as a lower index among the indices in a descending order of the similarity. Here, the number of candidate intra prediction modes (N) may be greater than or equal to "3", and the determining of the candidate prediction mode of the current block may allocate a prediction direction of the neighbor block as a first index and a second index that are lower indices, in a descending order of the similarity, and, after a third index, allocate a neighbor block having a relatively great similarity among neighbor blocks having close distances from the first index and the second index.

Another exemplary embodiment of the present invention provides an apparatus for encoding an intra prediction mode of an image, the apparatus including: a similarity detector to detect a similarity of a prediction direction of a neighbor block with respect to a current block based on a position of the neighbor block and an intra prediction direction of the neighbor block with respect to the current block; and a candidate prediction mode determining unit to determine a candidate prediction mode of the current block based on the similarity and the number of candidate intra prediction modes (N). Also, the intra prediction mode encoding apparatus may further include a neighbor block direction determining unit to determine the intra prediction direction of the neighbor block adjacent to the current block. the number of candidate intra prediction modes (N) may be greater than or equal to "3". Also, the neighbor block may include a left block and an upper block based on the current block. The neighbor block may include a left block, an upper left block, an upper block, an upper right block, and a lower left block based on the current block. Here, the similarity detector may detect the similarity of the prediction direction of the neighbor block with respect to the current block based on a width of an overlapping area with the current block when extending the neighbor block along the intra prediction direction of the neighbor block from the position of the neighbor block. The candidate prediction mode may include the number of indices corresponding to the number of candidate intra prediction modes (N), and the candidate prediction mode determining unit may allocate a prediction direction of the neighbor block as a lower index among the indices in a descending order of the similarity. Here, the number of candidate intra prediction modes (N) may be greater than or equal to "3", and the candidate prediction mode determining unit may allocate a prediction direction of the neighbor block as a first index and a second index that are lower indices, in a descending order of the similarity, and, after a third index, allocate a neighbor block having a relatively great similarity among neighbor blocks having close distances from the first index and the second index. Another exemplary embodiment of the present invention provides an apparatus for encoding an intra prediction mode of an image, the apparatus including:

An intra prediction mode encoding method according to another exemplary embodiment of the present invention includes obtaining a first neighbor block that includes a pixel positioned above by a single pixel from an upper left pixel within a current block, and is encoded before the current block; obtaining a second neighbor block that includes a pixel positioned on the left side by a single pixel from the upper left pixel within the current block, and is encoded before the current block; and determining a candidate intra prediction mode of the current block based on intra prediction mode information of the first and second neighbor blocks. The determining of the candidate intra prediction mode of the current block based on intra prediction mode information of the first and second neighbor blocks may include changing a candidate intra prediction mode of a neighbor block having the number of intra prediction modes greater than the number of probable intra prediction modes of the current block with a new intra prediction mode value that maps a probable intra prediction mode of the current block based on a mapping table and thereby determining the new intra prediction mode value as the candidate intra prediction mode, when the neighbor block having the number of intra prediction modes greater than the number of probable intra prediction modes of the current block is present between the first neighbor block and the second neighbor block. The determining of the candidate intra prediction mode of the current block based on intra prediction mode information of the first and second neighbor blocks may include determining, as the candidate intra prediction mode value, an intra prediction mode of a neighbor block having the number of probable intra prediction modes smaller than the number of intra prediction modes of the current block, when the neighbor block having the number of intra prediction modes smaller than the number of probable intra prediction modes of the current block is present between the first neighbor block and the second neighbor block. The determining of the candidate intra prediction mode of the current block based on intra prediction mode information of the first and second neighbor blocks may include detecting a similarity of a prediction direction of a neighbor block with respect to the current block based on a position of the neighbor block and an intra prediction direction of the neighbor block with respect to the current block; and determining the candidate intra prediction mode of the current block based on the similarity and the number of candidate intra prediction modes (N). Here, the neighbor block may include a left block and an upper block based on the current block. Alternatively, the neighbor block may include at least two of the left block, the upper left block, the upper block, an upper right block, and a lower left block based on the current block. Here, the detecting of the similarity may detect the similarity of the prediction direction of the neighbor block with respect to the current block based on a width of an overlapping area with the current block when extending the neighbor block along an intra prediction direction of the neighbor block from the position of the neighbor block. The candidate intra prediction mode may include the number of indices corresponding to the number of candidate intra prediction modes (N), and the determining of the candidate intra prediction mode of the current block may allocate a prediction direction of the neighbor block as a lower index among the indices in a descending order of the similarity. Here, the number of candidate intra prediction modes (N) may be greater than or equal to "3", and the determining of the candidate intra prediction mode of the current block may allocate a prediction direction of the neighbor block as a first index and a second index that are lower indices, in a descending order of the similarity, and, after a third index, allocate a neighbor block having a relatively great similarity among neighbor blocks having a close distance from the first index and the second index.

A method for decoding an intra prediction mode of an image according to another exemplary embodiment of the present invention includes obtaining a first neighbor block that includes a pixel positioned above by a single pixel from an upper left pixel within a current block, and is decoded before the current block; obtaining a second neighbor block that includes a pixel positioned on the left side by a single pixel from the upper left pixel within the current block, and is decoded before the current block; and determining a candidate intra prediction mode of the current block based on intra prediction mode information of the first and second neighbor blocks. The determining of the candidate intra prediction mode of the current block based on intra prediction mode information of the first and second neighbor blocks may include changing a candidate intra prediction mode of a neighbor block having the number of probable intra prediction modes greater than the number of intra prediction modes of the current block with a new intra prediction mode value that maps a probable intra prediction mode of the current block based on a mapping table and thereby determining the new intra prediction mode value as the candidate intra prediction mode, when the neighbor block having the number of intra prediction modes greater than the number of probable intra prediction modes of the current block is present between the first neighbor block and the second neighbor block. The determining of the candidate intra prediction mode of the current block based on intra prediction mode information of the first and second neighbor blocks may include determining, as the candidate intra prediction mode value, an intra prediction mode of a neighbor block having the number of intra prediction modes smaller than the number of probable intra prediction modes of the current block when the neighbor block having the number of intra prediction modes smaller than the number of probable intra prediction modes of the current block is present between the first neighbor block and the second neighbor block. The determining of the candidate intra prediction mode of the current block based on intra prediction mode information of the first and second neighbor blocks may include detecting a similarity of a prediction direction of a neighbor block with respect to the current block based on a position of the neighbor block and an intra prediction direction of the neighbor block with respect to the current block; and determining the candidate intra prediction mode of the current block based on the similarity and the number of candidate intra prediction modes (N). The determining of the candidate intra prediction mode of the current block based on intra prediction mode information of the first and second neighbor blocks may include detecting a similarity of a prediction direction of a neighbor block with respect to the current block based on a position of the neighbor block and an intra prediction direction of the neighbor block with respect to the current block; and determining the candidate intra prediction mode of the current block based on the similarity and the number of candidate intra prediction modes (N). The detecting of the similarity may detect the similarity of the prediction direction of the neighbor block with respect to the current block based on a width of an overlapping area with the current block when extending the neighbor block along an intra prediction direction of the neighbor block from the position of the neighbor block. The candidate intra prediction mode may include the number of indices corresponding to the number of candidate intra prediction modes (N), and the determining of the candidate intra prediction mode of the current block may allocate a prediction direction of the neighbor block as a lower index among the indices in a descending order of the similarity. the number of candidate intra prediction modes (N) may be greater than or equal to "3", and the determining of the candidate intra prediction mode of the current block may allocate a prediction direction of the neighbor block as a first index and a second index that are lower indices, in a descending order of the similarity, and, after a third index, allocate a direction having a great similarity among neighbor directions having a close distance from the first index and the second index.

An apparatus for decoding an intra prediction mode of an image according to another exemplary embodiment of the present invention includes a similarity detector to detect a similarity of a prediction direction of a neighbor block with respect to a current block based on a position of the neighbor block and an intra prediction direction of the neighbor block with respect to the current block; and a candidate intra prediction mode determining unit to determine a candidate intra prediction mode of the current block based on the similarity and the number of candidate intra prediction modes (N).

Unlike a related art of determining a candidate intra prediction mode of a current block using only two MPMs, a method and an apparatus for encoding an intra prediction mode according to the aforementioned exemplary embodiments of the present invention may be applied to a variety of intra encoding systems by extending the number of MPMs to N MPMs, and may determine a candidate intra prediction mode of the current block by determining a continuity and a similarity of a prediction direction with respect to a current block based on a position and prediction direction of a neighbor block and selecting an MPM in a descending order of the similarity. Accordingly, unlike the related art in which only global statistics are considered, it is possible to more accurately and efficiently compress information about an intra prediction mode of the current block by considering local statistics and to improve intra encoding performance of an image.

BRIEF DESCRIPTION OF THE DRAWINGS

The features and advantages of the present invention will become apparent and more readily appreciated from the following description of exemplary embodiments taken in conjunction with the accompanying drawings of which.

DETAILED DESCRIPTION

Figure 1:
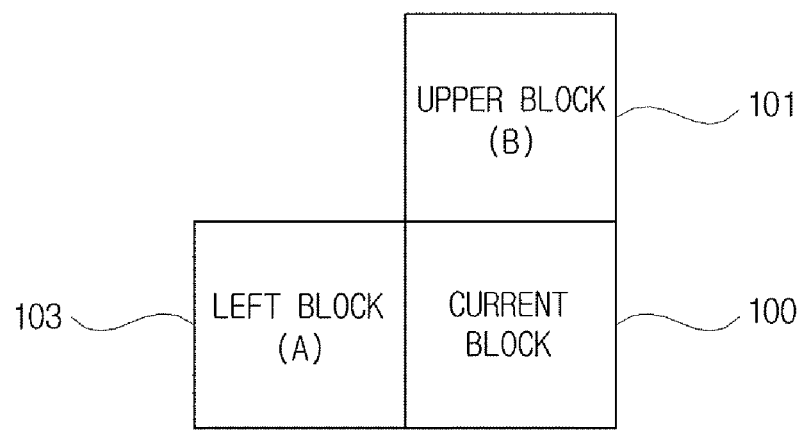
FIG. 1 is a conceptual diagram illustrating positions of a current block and a neighbor block.

The present invention may be variously modified and may have various exemplary embodiments and thus, a few exemplary embodiments are illustrated in drawings and will be described in detail.

However, it is not to limit the present invention to a few exemplary embodiments and thus, it should be understood to include all of the modifications and their equivalents and substitutions, without departing from the principles and spirit of the present invention.

When it is determined that the detailed description related to a related known function or configuration may make the purpose of the present invention unnecessarily ambiguous in describing the present invention, the detailed description will be omitted here.

Terminologies, such as "first", "second", and the like, may be used to explain various constituent elements. However, the constituent elements should not be limited by the terminologies. The terminologies are used only to distinguish one constituent element from another constituent element. For example, without departing from the scope of the present invention, a first constituent element may be referred to as a second constituent element. Similarly, the second constituent element may be referred to as the first constituent element. The terminology "and/or" includes a combination of items described in association with a "plurality of" or any one of the items described in association with the "plurality of".

When it is described that a predetermined constituent element is "connected to" or "accessed to" another constituent element, the predetermined constituent element may be directly connected to or accessed to the other constituent element, however, should be understood that still another constituent element may be present between the predetermined constituent element and the other constituent element. On the other hand, when it is described that the predetermined constituent element is "directly connected to" or "directly accessed to" the other constituent element, it should be understood that still another constituent element is absent between the predetermined constituent element and the other constituent element.

A terminology used in the present application is used to simply explain a predetermined exemplary embodiment and thus, is not to limit the present invention. Unless particularly described in a sentence, a singular form may also include a plural form. In the present application, the terminology "includes (comprises)" or "has" should be understood to designate the presence of a feature, a number, a step, an operation, a constituent element, and a part described in the specification, or a combination thereof, and not to pre-exclude the presence or addition of at least one another feature, number, step, operation, constituent element, or a combination thereof.

Constituent units described in exemplary embodiments of the present invention are independently illustrated in order to indicate different characteristic functions and thus, do not indicate that each of the constituent units includes separate hardware or single software constituent unit. That is, for ease of description, the respective constituent units are individually arranged. Therefore, at least two constituent units may be integrated into and thereby constitute a single constituent unit or a single constituent unit may be divided into a plurality of constituent units to thereby perform a function. Exemplary embodiments in which the respective constituent elements are integrated and exemplary embodiments in which the respective constituent elements are separate are also included in the scope of the present invention without departing from the spirit of the present invention.

Unless differently defined, all of the terminologies used herein, including technical or scientific terminologies, have the same meaning as a meaning generally understood by those skilled in the art. Terminologies defined in the generally used dictionary should be understood to have a meaning that matches a contextual meaning of the related art and thus, should not be understood as an ideological or excessively formal meaning unless clearly defined in the present application.

Hereinafter, exemplary embodiments of the present invention will be described in detail with reference to the accompanying drawings. For overall easy understanding in describing the present invention, like reference numerals refer to like constituent elements illustrated in the drawings and a repeated description related to the same constituent element will be omitted.

Hereinafter, exemplary embodiments of the present invention will be described in detail with reference to the drawings. The following exemplary embodiments are to describe a specific exemplary embodiment for realizing technical spirit of a method and apparatus for encoding an intra prediction mode of an image according to the present invention. Accordingly, the technical scope of the present invention is not limited to or restricted by the exemplary embodiments.

Intra Prediction Mode Encoding Method

To obtain information about an encoded prediction unit using an intra prediction (or an in-screen prediction) method, intra prediction mode information needs to be induced. To induce the intra prediction mode information, a position of a current prediction unit (or a current block), size information of the current prediction unit, and intra prediction mode information of a neighbor block of the current prediction unit that is encoded (or decoded) before the current prediction unit is used.

The following Table 1 is a table illustrating an example of a type of an intra prediction mode.

TABLE 1

| Intra prediction mode | Associated names |
| --- | --- |
| 0 | Intra_Planar |
| 1 | Intra_Vertical |
| 2 | Intra_Horizontal |
| 3 | Intra_DC |
| Otherwize (4 . . . 34) | Intra_Angular |
| 35 | Intra_FromLuma (used only for chroma) |

Referring to Table 1, there are intra prediction modes of "0" to "35". Numbers "0" and "3" are a planar mode and a DC mode, respectively, and remaining numbers are directivity modes. Intra prediction may be performed in a direction of an arrow indicator of FIG. 2. Referring again to Table 1, luminance (Luma) information uses intra prediction modes of "0" to "34". A chrominance (Chroma) signal uses intra prediction modes of "0" to "3", and "7", and a number "35" (Intra From Luma) that obtains a prediction value from a luminance signal.

Prediction units with a size of 4×4 to 64×64 may be used. Based on the size of each prediction unit, the number of intra prediction modes available may vary.

An intra prediction mode with respect to a current prediction unit may be induced using the following method.

A most probable mode (MPM) is a method of predicting intra prediction mode information of the current prediction unit from an inter prediction mode of a neighboring prediction unit.

When an upper left pixel of the current prediction unit (current block) is assumed as (xB, yB), obtained are a neighboring prediction unit (hereinafter, referred to as a first prediction unit) that includes a pixel (xB, yB−1) positioned above by a single pixel from the upper left pixel based on tree block information and is encoded(decoded) before the current prediction unit, and a neighboring prediction unit (hereinafter, referred to as a second prediction unit) that includes a pixel (xB−1, yB) positioned on the left side by a single pixel from the upper left pixel based on tree block information and is encoded (decoded) before the current prediction unit.

When the number of intra prediction modes of the neighboring prediction unit (the first prediction unit or the second prediction unit) is greater than the number of probable intra prediction modes of the current prediction unit, a candidate intra prediction mode of the neighboring prediction unit is changed with a new intra prediction mode value that maps a probable intra prediction mode of the current prediction unit based on a predetermined mapping table. That is, since the number of available intra prediction modes varies based on a size of the prediction unit, it is possible to change intra prediction mode information of the neighboring prediction mode to fit the current prediction unit based on the predetermined mapping table.

When an intra prediction mode value of the neighboring prediction unit is smaller than the number of probable prediction modes of the current prediction unit, the intra prediction mode value of the neighboring prediction unit is immediately used as a candidate intra prediction mode value without using the mapping table.

Figure 3:
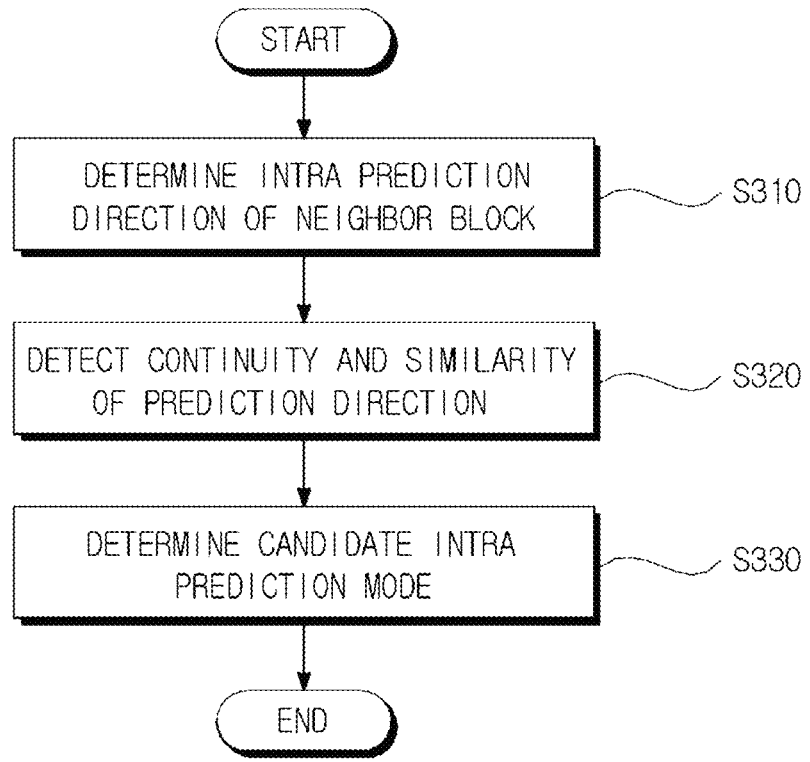
FIG. 3 is a flowchart illustrating an intra prediction mode encoding method according to an exemplary embodiment of the present invention.

FIG. 3 is a flowchart of an intra prediction mode encoding method according to an exemplary embodiment of the present invention.

As illustrated in FIG. 3, the intra prediction mode encoding method according to an exemplary embodiment of the present invention may include operation S310 of determining an intra prediction direction of a neighbor block adjacent to a current block, operation S320 detecting a similarity of a prediction direction of the neighbor block with respect to the current block based on a position of the neighbor block and the intra prediction direction of the neighbor block with respect to the current block, and operation S330 of determining a candidate intra prediction mode of the current block based on the similarity and the number of candidate intra prediction modes (N).

Hereinafter, the intra prediction mode encoding method will be described further in detail with reference to FIGS. 3 through 9.

Referring again to FIG. 1, to encode an intra prediction mode of the current block 100, intra prediction directions of the neighbor blocks 101 and 103 are determined by performing intra prediction with respect to the neighbor blocks 101 and 103 adjacent to the current block 100 (S310). In a general image compression encoding process, the neighbor blocks 101 and 103 are already encoded prior to encoding the current block 100. Accordingly, the intra prediction modes of the neighbor blocks 101 and 103 that are determined during the encoding process of the neighboring blocks 101 and 103 may be used for an encoding process of the current block 100.

When intra prediction directions of neighbor blocks are determined, a similarity of a prediction direction of a neighbor block with respect to the current block is detected based on a position of the neighbor block and the intra prediction direction of the neighbor block with respect to the current block (S320). For intra mode encoding of the current block, the intra prediction direction of the current block needs to be predicted. To predict the intra prediction direction, the position of the neighbor block and the intra prediction direction of the neighbor block are used in a relationship with the current block. An intra prediction direction of a block having a relatively great similarity is highly likely to be the same as the intra prediction direction of the current block. It is assumed that directivity of the neighbor block is continued to the current block and tendency of the prediction direction is maintained.

Here, operation S320 of detecting the similarity may detect the similarity of the prediction direction of the neighbor block with respect to the current block based on a width of an overlapping area with the current block when extending the neighbor block along the intra prediction direction of the neighbor block from the position of the neighbor block.

Figure 4:
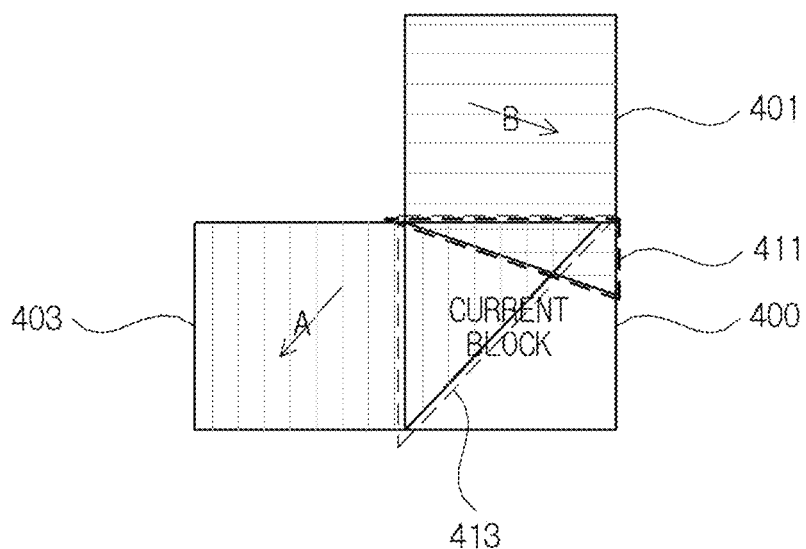
FIG. 4 is a conceptual diagram illustrating a similarity of a prediction direction with respect to a current block.

FIG. 4 is a conceptual diagram illustrating a similarity of a prediction direction with respect to a current block according to an exemplary embodiment of the present invention.

As illustrated in FIG. 4, to detect a similarity of a prediction direction of neighbor block (401 or 403) with respect to a current block 400, it is possible to extend the neighbor block (401 or 403) along an intra prediction direction of the neighbor block (401 or 403).

In the case of a block B 401, when extending the block B 401 along an intra prediction direction of the block B 401, a portion 411 indicated by horizontal lines on the current block 400 indicates an overlapping area with the current block 400. The portion 411 indicated by horizontal lines may indicate a similarity of a prediction direction of the block B 401 with respect to the current block 400.

In the case of a block A 403, when extending the block A 403 along an intra prediction direction of the block A 403, a portion 413 indicated by vertical lines on the current block 400 indicates an overlapping area with the current block 400. The portion 413 indicated by the vertical lines may indicate a similarity of a prediction direction of the block A 403 with respect to the current block 400.

That is, when determining a continuity and a similarity of the prediction direction with respect to the current block 400 based on a position and the prediction direction of the block A 403, the continuity and the similarity may be expressed as an area, that is, the portion 413 indicated by the vertical lines. Similarly, even in the case of the block B 401, effect to the current block 400 may be expressed as an area, that is, the portion 411 indicated by the vertical lines. As described above, the following Equation 1 expresses a process of detecting the continuity and the similarity of each of the block A 403 and the block B 401 with respect to the current block 400.

$$M = \mathrm{argmax}_{x \in N}(E_x), x=A,B \qquad \text{[Equation 1]}$$

Figure 5:
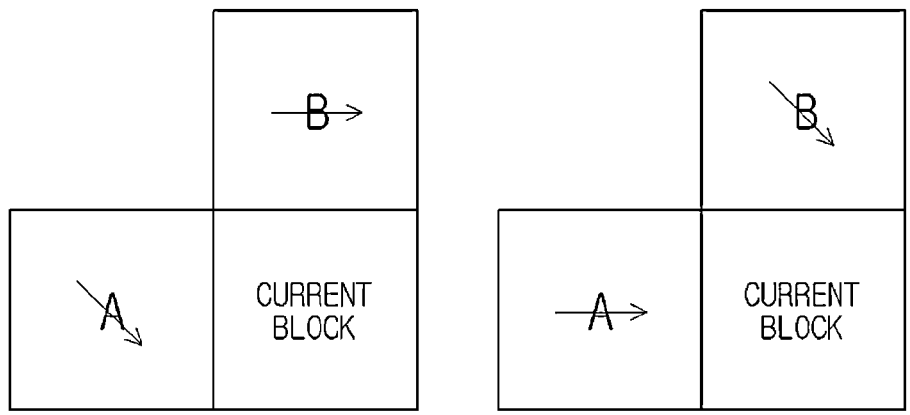
FIG. 5 is a conceptual diagram illustrating effect of a position and a prediction direction of a neighbor block.

FIG. 5 is a conceptual diagram illustrating effect of a position and a prediction direction of a neighbor block.

As illustrated in FIG. 5, even in the case of a prediction mode having the same directivity, effect to a current block may vary based on a position of a block. In the case of an example on the left side of FIG. 5, a prediction direction of a block A affects the current block relatively greatly. A prediction direction of a block B does not affect the current block at all. However, in the case of an example on the right side of FIG. 5, it can be seen that the prediction direction of the block A affects the current block by 100% and the prediction direction of the block B affects the current block relatively small.

After detecting a similarity of a neighbor block with respect to the current block, a candidate intra prediction mode of the current block is determined based on the similarity and the number of candidate intra prediction modes (N) (S330).

the number of candidate intra prediction modes (N) may be greater than or equal to "3". A method of encoding an intra prediction mode according to the related art uses the number of candidate intra prediction modes (MPM) that is determined as "2" and thus, predicts the current block using only two adjacent blocks without considering a similarity that affects the current block based on a position and directivity of the neighbor block. Accordingly, only global statistics are considered. Therefore, even when a similarity of a block relatively away from the current block between the two adjacent blocks is higher, the two adjacent blocks are selected as MPMs and thus, accurate prediction may be impossible. Unlike determining the candidate intra prediction mode using only two MPMs, when extending the number of MPMs to be greater than or equal to "3" (N), it may be more adaptively applied to a variety of intra encoding systems. Based on a user selection, the number of candidate intra prediction modes (N) may be pre-set to be greater than or equal to "1".

In determining the candidate intra prediction mode (S330), the candidate intra prediction mode may include the number of indices corresponding to the number of candidate intra prediction modes (N). Operation S330 of determining the candidate intra prediction mode of the current block may allocate a prediction direction of the neighbor block as a lower index among the indices in a descending order of the similarity. Here, the indices are used to identify a plurality of candidate intra prediction modes, respectively, when the plurality of candidate intra prediction modes is present. For example, the indices may be indicated as MPM[0], MPM[1], and MPM[2]. The indices may be generally referred to as a first index, a second index, and a third index, respectively. Here, the index indicated using a low number such as MPM [0] may be a lower index. Therefore, when similarities of neighbor blocks A, B, and C are great sequentially in an order of the blocks A, B, and C, the block A may be allocated to MPM[0], the block B may be allocated to MPM[1], and the block C may be allocated to MPM[2].

In an intra prediction mode encoding method according to the present invention, the neighbor block may include a left block and an upper block based on a current block (embodiment 1). The neighbor block may include the left block, an upper left block, the upper block, an upper right block, and a lower left block based on the current block (embodiment 2). Accordingly, a description will be made based on a case (embodiment 1) in which {A, B} are used for the neighbor block and a case (embodiment 2) in which {A, B, C, D, E} are used for the neighbor block. Unlike a case in which the number of MPMs is fixed to "2" and thereby is used for intra prediction mode encoding of an existing HEVC scheme, the present invention may use the number of MPMs, starting with "1" to N". Accordingly, a case in which the number of MPMs is greater than or equal to "3" will be also described.

Figure 2:
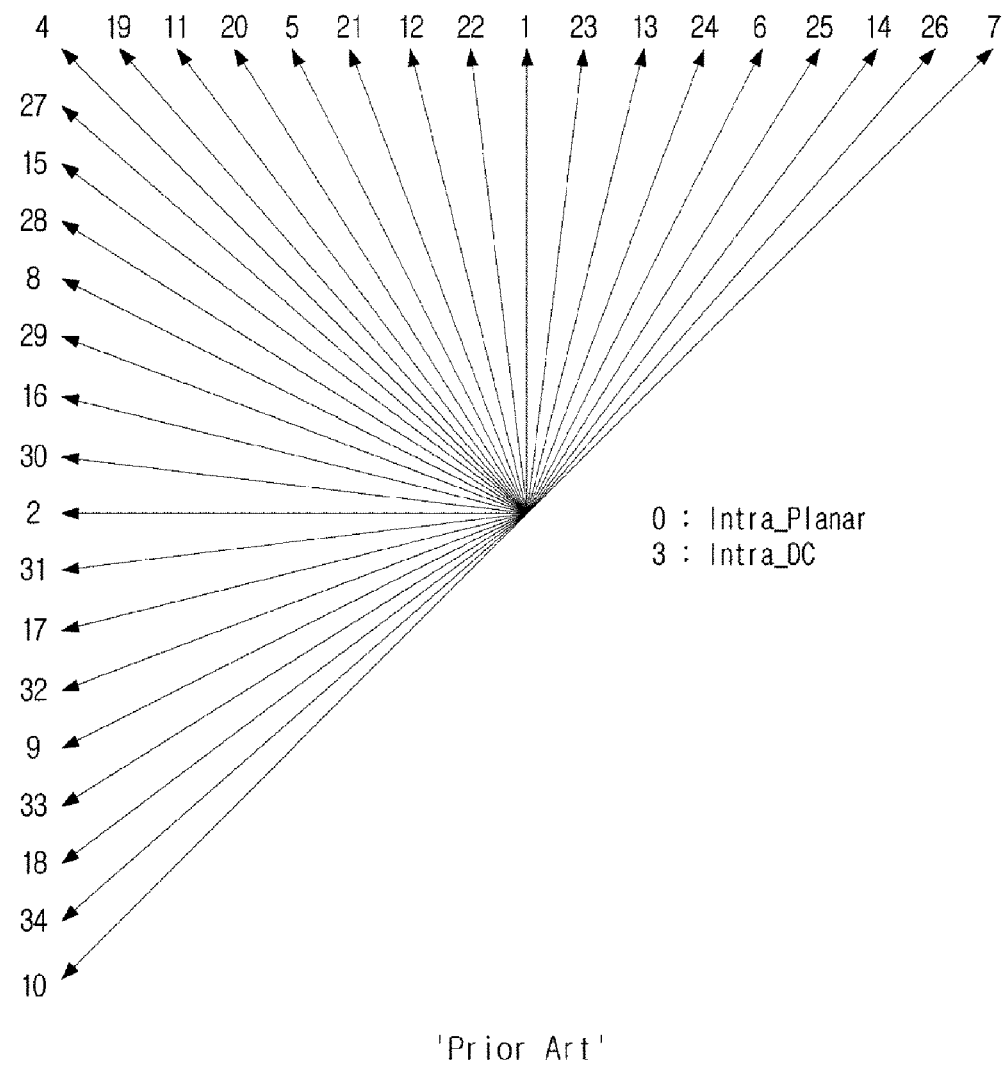
FIG. 2 is a diagram illustrating an example of 35 intra prediction modes of a high efficiency video coding (HEVC) scheme.
Figure 6:
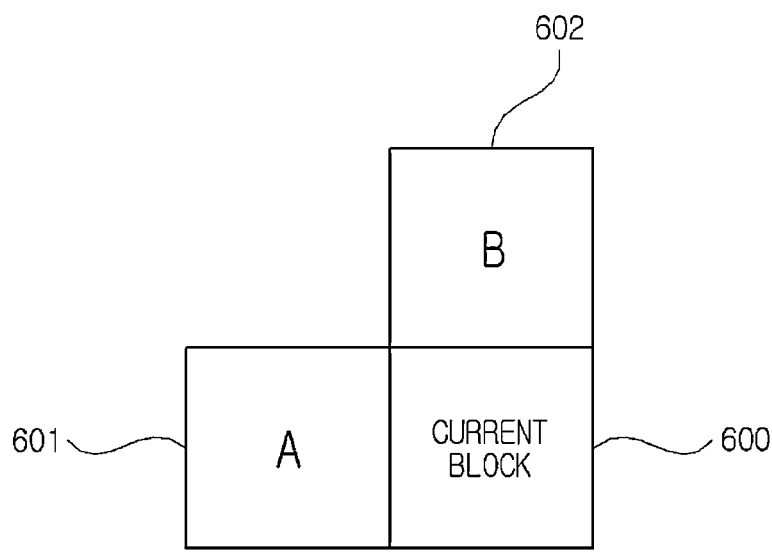
FIG. 6 is an exemplary diagram of a neighbor block according to an exemplary embodiment of the present invention.
Figure 7:
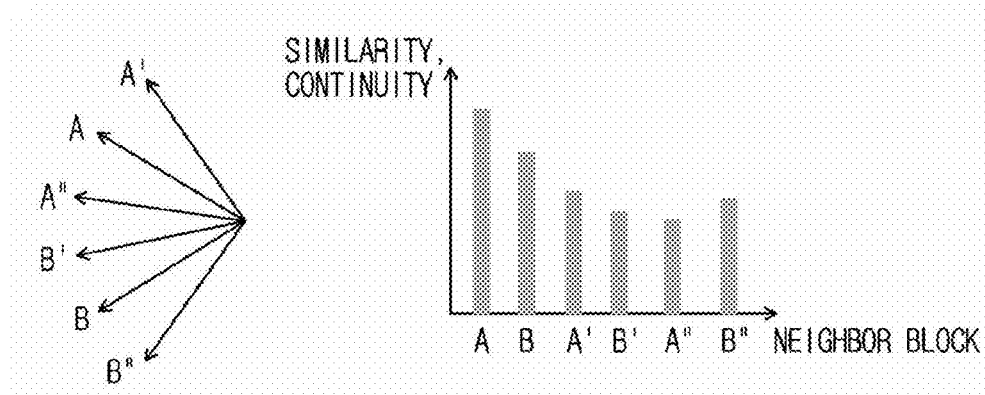
FIG. 7 is a graph illustrating a similarity of a prediction mode with respect to the neighbor block of FIG. 6.

Embodiment 1-case in which a neighbor block includes a left block and an upper block FIG. 6 is an exemplary diagram of a neighbor block in a case in which {A, B} are used for the neighbor block according to an exemplary embodiment of the present invention, and FIG. 7 is a graph illustrating a similarity of a prediction mode with respect to the neighbor block of FIG. 6. An intra prediction mode encoding method based on the number of MPMs in the case (embodiment 1) in which {A, B} are used for the neighbor block will be described with reference to FIGS. 6 and 7. A diagram on the left side of FIG. 7 illustrates a direction of a prediction mode of each of a block A 601 and a block B 602, and a diagram on the right side of FIG. 7 illustrates magnitude of a similarity affecting a current block 600 with respect to a prediction mode direction of each neighbor block (601 and 602). Here, directions A, A', and A" indicate a direction of a prediction mode of the block A 601, and directions B, B', and B" indicates a direction of a prediction mode of the block B 602. The direction A is a direction of an intra prediction mode of the block A 601, and the direction B is a direction of an intra prediction mode of the block B 602. In a case in which the left block and the upper block are included as the neighbor block, the number of MPMs may be greater than or equal to "2". Therefore, the directions A' and A" having the closest distance from the direction A, determined as MPM, and the directions B' and B" having the closest distance from the direction B may be referred to. Referring to FIG. 2, for example, when the direction A is a number 4 intra mode, the directions A' and A" may be defined as number 19 and 27 intra modes having the closest distance from the direction A and thereby be referred to. Here, A' and A" may also be defined as number 27 and number 19, respectively.

In the exemplary embodiment of FIGS. 6 and 7, when the number of candidate intra prediction modes (N) is "1", that is, when the number of MPMs is "1", a similarity to the current block 600 has the largest value in the block A 601. Therefore, $E_A$ is selected according to the aforementioned Equation 1 and the block A 601 is determined as MPM. When the number of MPMs is "2", the block A 601 having the maximum similarity is selected as a lower index of MPM, that is, MPM[0] and the block B 602 is selected as MPM[1].

Here, the number of candidate intra prediction modes (N) may be greater than or equal to "3", and operation S330 of determining the candidate intra prediction mode of the current block may allocate a prediction direction of the neighbor block as a first index and a second index that are lower indices, in a descending order of the similarity, and, after a third index, allocate a neighbor block having a relatively great similarity among neighbor blocks having a close distance from the first index and the second index.

For example, when the number of MPMs is "3", the block A 601 having the maximum similarity is selected as the first index (MPM[0]), the block B 602 having the second largest similarity is selected as the second index (MPM[1]), and the third index (MPM[2]) is selected from among directions having a close distance from the first index (MPM[0]) that is a prediction mode having the maximum similarity.

That is, the direction A of the block A 601 is MPM[0] and thus, a direction having a greater similarity is selected from between the directions A' and A". Referring again to FIG. 7, since the direction A' shows the greater similarity, the direction A' is selected as MPM[2].

When the number of MPMs is "4", MPM[0] and MPM[1] are selected similarly to a case in which the number of MPMs is "3". A block having the maximum similarity among blocks having a close distance from MPM[0] is selected as MPM[2]. A block having the maximum similarity among blocks having a close distance from MPM[1] is selected as MPM[3]. Referring to FIG. 7, MPM[2] may be selected from between the direction A' and the direction A". Since distances of the directions A' and A" from the direction A are identical, the direction A' having a greater similarity is selected as MPM[2]. MPM[3] may be selected from between the direction B' and the direction B". Similarly, the direction B" has a greater similarity than the direction B' and thus, is selected as MPM[3]. The number of MPMs may be extended to be "N" in the same manner.

To be applied to a high resolution having a resolution of at least a high definition (HD) level, the HEVC scheme may perform intra prediction using an extended macro block size greater than or equal to a (32×32) pixel size. The HEVC scheme may use a cyclic coding unit (CU). The coding unit may have a hierarchical structure with a variable size.

That is, a size of a block that is a unit of encoding is various based on a partial characteristic of a picture and thus, the number of left blocks 601 of the current block 600 may be plural. Therefore, in intra mode encoding according to an exemplary embodiment of the present invention, the left block 601 may be any one of blocks adjacent to the left side of the current block 600. Based on setting, a block positioned on the lower end among the blocks adjacent to the left side of the current block 600 may be regarded as the left block.

Similarly, the number of upper blocks 602 of the current block 600 may also be plural. Therefore, in intra mode encoding according to an exemplary embodiment of the present invention, the upper block 602 may be any one of blocks adjacent to an upper portion of the current block 600. Based on setting, a block positioned on the leftmost among the blocks adjacent to the upper portion of the current block may be regarded as the upper block.

Depending on cases, determination may be made by detecting a similarity with respect to the current block, with respect to all of the plurality of left blocks or the plurality of upper blocks.

Embodiment 2case in which a neighbor block includes blocks {A, B, C, D, E}

Figure 8:
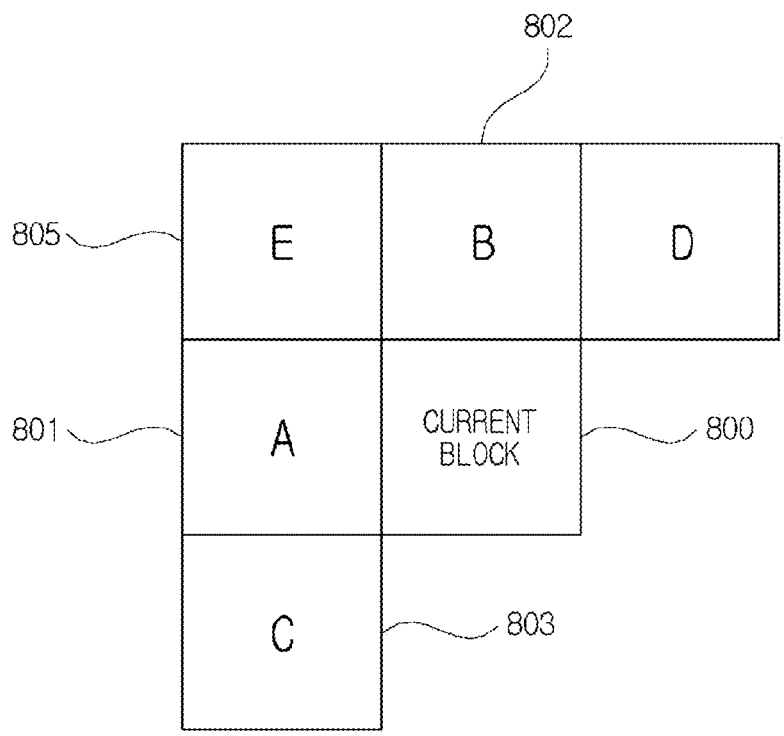
FIG. 8 is an exemplary diagram of a neighbor block according to another exemplary embodiment of the present invention.
Figure 9:
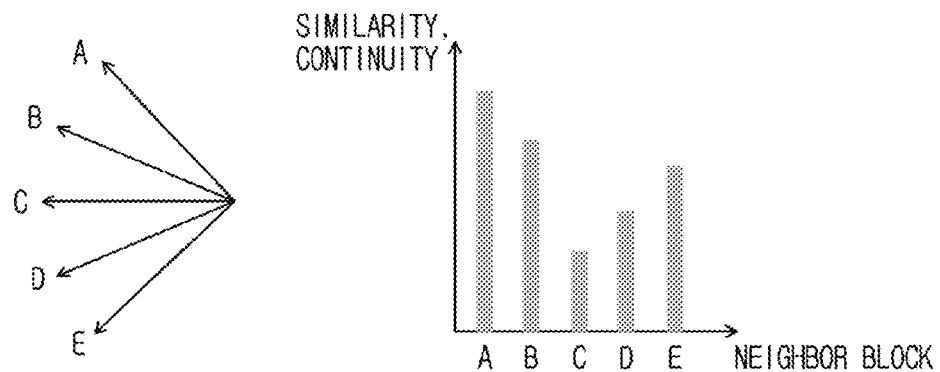
FIG. 9 is a graph illustrating a similarity of a prediction mode with respect to the neighbor block of FIG. 8.

FIG. 8 is an exemplary diagram of a neighbor block according to another exemplary embodiment of the present invention, and FIG. 9 is a graph illustrating a similarity of a prediction mode with respect to the neighbor block of FIG. 8.

An intra prediction mode encoding method based on the number of MPMs in the case (embodiment 2) in which {A, B, C, D, E} are used for the neighbor block will be described with reference to FIGS. 8 and 9. A diagram on the left side of FIG. 9 illustrates a direction of a prediction mode of each of a block A 801, a block B 802, a block C 803, a block D 804, and a block E 805. A diagram on the right side of FIG. 9 illustrates magnitude of a similarity affecting a current block 800 with respect to a prediction mode direction of each neighbor block (801, 802, 803, 804, and 805). The following Equation 2 expresses an area, that is, a similarity, of effect that affects the current block 800 based on a position and directivity of each neighbor block (801, 802, 803, 804, and 805) in a case in which {A, B, C, D, E} are used for the neighbor block.

$$M = \mathrm{argmax}_{x \in N}(E_x), x = A, B, C, D, E \qquad \text{[Equation 2]}$$

In the exemplary embodiment of FIGS. 8 and 9, when the number of candidate intra prediction modes (N) is "1", that is, when the number of MPMs is "1", a similarity to the current block 800 has the largest value in the block A 801. Therefore, $E_A$ is selected according to the aforementioned Equation 2 and the block A 801 is selected as MPM. When the number of MPMs is "2", the block A 801 having the maximum similarity is selected as a lower index of MPM, that is, MPM[0] and the block B 802 is selected as MPM[1]. When the number of MPMs is "3", the block A 801 having the maximum similarity is selected as MPM[0], the block B 802 having the second largest similarity is selected as MPM[1], and the block E 805 having the third largest similarity is selected as MPM[2]. Similarly, even when the number of MPMs is "4", a block is selected as a lower index of MPM sequentially in a descending order of the similarity. That is, referring again to FIG. 9, magnitude of the similarity is sorted in an order of A, B, E, D, and C, and thus, blocks are selected as MPM[0], MPM[1], MPM[2], and MPM[3], respectively. The number of MPMs may be extended to be "N" in the same manner.

According to the aforementioned method, with respect to a case in which the neighbor block includes the left block and the upper block based on a current block and a case in which the neighbor block includes the left block, an upper left block, the upper block, an upper right block, and a lower left block based on the current block, it is possible to extend the number of MPMs to be greater than or equal to "3". It is possible to determine a candidate intra prediction mode based on a similarity and a continuity of the neighbor blocks with respect to the current block.

As described above, to be applied to a high resolution having a resolution of at least an HD level, the HEVC scheme may perform intra prediction using an extended macro block size greater than or equal to a (32×32) pixel size. The HEVC scheme may use a cyclic coding unit. The coding unit may have a hierarchical structure with a variable size.

That is, a size of a block that is a unit of encoding is various based on a partial characteristic of a picture and thus, the number of left blocks 801 of the current block 800 may be plural. Therefore, in intra mode encoding according to an exemplary embodiment of the present invention, the left block 801 may be any one of blocks adjacent to the left side of the current block 800. Based on setting, a block positioned on the lower end among the blocks adjacent to the left side of the current block 800 may be regarded as the left block.

Similarly, the number of upper blocks 802 of the current block 800 may also be plural. Therefore, in intra mode encoding according to an exemplary embodiment of the present invention, the upper block 802 may be any one of blocks adjacent to an upper portion of the current block 800. Based on setting, a block positioned on the leftmost among the blocks adjacent to the upper portion of the current block may be regarded as the upper block.

Depending on cases, determination may be made by detecting a similarity with respect to the current block, with respect to all of the plurality of left blocks or the plurality of upper blocks.

Hereinafter, an encoding process after MPM selection according to an exemplary embodiment of the present invention will be described.

Initially, when an intra prediction mode number of a current block matches MPM, an MPM flag is encoded "1" indicating that the intra prediction direction with respect to the current block matches MPM and thereby is inserted into a bitstream and is transmitted.

Next, when the number of MPMs is plural, an index indicating which MPM matches the intra prediction mode of the current block is encoded to a binary number and transmitted. For example, in HEVC intra encoding, when the number of MPMs is "2", a one-bit flag indicating an MPM index as zero or "1" is additionally encoded and is transmitted. When the number of MPMs is "4", a 2-bit flag indicating an MPM index as "00", "01", "10", or "11" is additionally encoded and transmitted.

Since a probability that the intra prediction mode of the current block matches MPM is high, a probability that information about the intra prediction direction of the current block is expressed as a single bit increases and thus, compression of information is performed. Even though the intra prediction direction of the current block is not directly transmitted, a reception side may obtain MPM by referring to intra prediction mode numbers of the upper block and the left block. Accordingly, it is possible to perform decoding into an intra prediction direction indicated by the MPM.

On the contrary, when the intra prediction mode number of the current block does not match MPM, "0" indicating that the intra prediction direction of the current block is different from MPM is inserted into a bitstream. Next, remaining 34 (=35-1) intra prediction modes excluding MPM from 35 (4×4) intra prediction modes are classified based on a binary number of five to six bits. That is, up to a case in which the intra prediction mode is "32", the intra prediction mode may be expressed using five bits. After a case in which the intra prediction mode is "33", the intra prediction mode may be expressed using six bits.

Here, "XXXXX" or "XXXXXX" corresponding to the intra prediction mode number of the current block is inserted into a bitstream and thereby is transmitted. Accordingly, information about an intra prediction direction of the current block is expressed using a total of six to seven bits.

Intra Prediction Mode Encoding Apparatus

Figure 10:
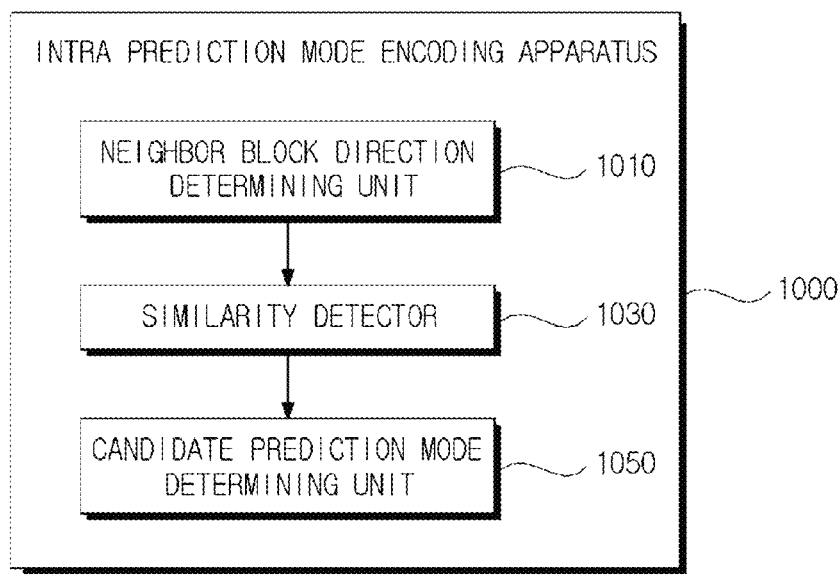
FIG. 10 is a block diagram illustrating an intra prediction mode encoding apparatus according to an exemplary embodiment of the present invention.

FIG. 10 is a block diagram of an intra prediction mode encoding apparatus according to an exemplary embodiment of the present invention.

As illustrated in FIG. 10, an intra prediction mode encoding apparatus 1000 according to an exemplary embodiment of the present invention may include a neighbor block direction determining unit 1010 to determine an intra prediction direction of a neighbor block adjacent to a current block, a similarity detector 1030 to detect a similarity of a prediction direction of the neighbor block with respect to the current block based on a position of the neighbor block and an intra prediction direction of the neighbor block with respect to the current block, and a candidate prediction mode determining unit 1050 to determine a candidate intra prediction mode of the current block based on the similarity and the number of candidate intra prediction modes (N).

Here, the number of candidate intra prediction modes (N) may be greater than or equal to "3".

The neighbor block may include a left block and an upper block based on the current block, and the neighbor block may also include the left block, an upper left block, the upper block, an upper right block, and a lower left block based on the current block.

The similarity detector 1030 may detect the similarity of the prediction direction of the neighbor block with respect to the current block based on a width of an overlapping area with the current block when extending the neighbor block along an intra prediction direction of the neighbor block from the position of the neighbor block.

The candidate intra prediction mode may include the number of indices corresponding to the number of candidate intra prediction modes (N), and the candidate prediction mode determining unit 1050 may allocate a prediction direction of the neighbor block as a lower index among the indices in a descending order of the similarity.

the number of candidate intra prediction modes (N) may be greater than or equal to "3", and the candidate prediction mode determining unit 1050 may allocate a prediction direction of the neighbor block as a first index and a second index that are lower indices, in a descending order of the similarity, and, after a third index, allocate a neighbor block having a relatively great similarity among neighbor blocks having a close distance from the first index and the second index.

A detailed operation method of an intra prediction mode encoding apparatus according to an exemplary embodiment of the present invention follows the aforementioned intra prediction mode encoding method.

Intra Prediction Mode Decoding Method

Figure 11:
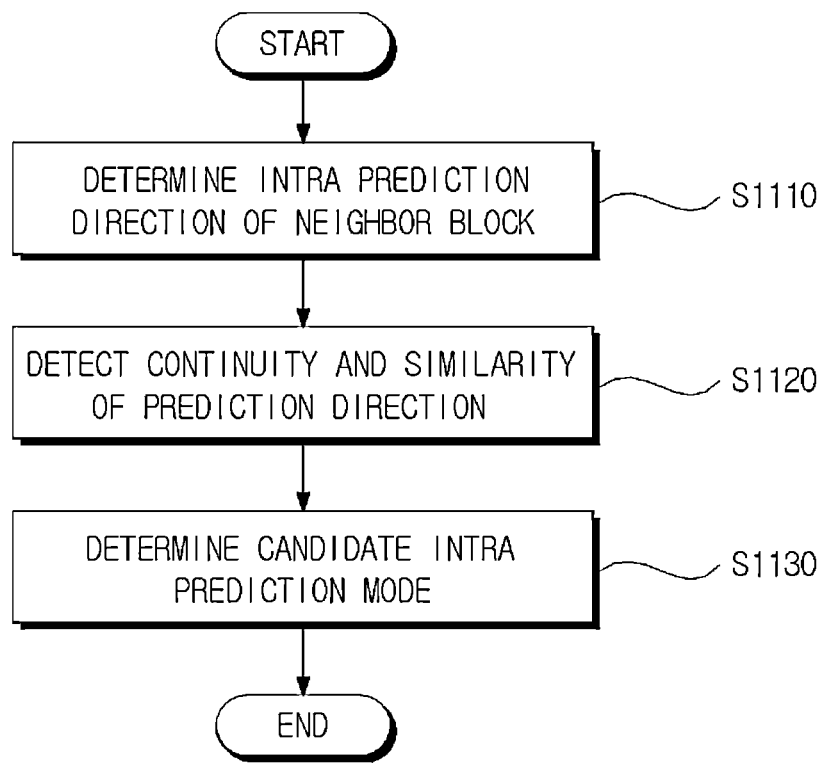
FIG. 11 is a flowchart illustrating an intra prediction mode decoding method according to an exemplary embodiment of the present invention.

FIG. 11 is a flowchart illustrating an intra prediction mode decoding method according to an exemplary embodiment, which is the same as the flowchart of the intra prediction mode encoding method provided in FIG. 3. As illustrated in FIG. 11, the intra prediction mode decoding method according to an exemplary embodiment of the present invention may include operation S1110 of determining an intra prediction direction of a neighbor block adjacent to a current block, operation S1120 detecting a similarity of a prediction direction of the neighbor block with respect to the current block based on a position of the neighbor block and the intra prediction direction of the neighbor block with respect to the current block, and operation S1130 of determining a candidate intra prediction mode of the current block based on the similarity and the number of candidate intra prediction modes (N).

A method of inducing MPM during the decoding process exactly matches the aforementioned encoding method. Initially, the decoding process differently proceeds based on whether the intra prediction direction of the current block matches or is different from MPM. Accordingly, an MPM flag indicating this is decoded from a bitstream.

In the encoding process, when the intra prediction mode number of the current block matches MPM, the MPM flag is encoded to "1" indicating that the intra prediction direction with respect to the current block matches MPM and thereby is inserted into the bitstream. When at least one MPM is present, an MPM index indicating which MPM matches the intra prediction mode of the current block is encoded and thereby is inserted into a back of the MPM flag. For example, when the number of MPMs is four, the MPM index is encoded based on two bits. On the contrary, when the intra prediction mode number of the current block does not match MPM, the MPM flag may be encoded to "0" and thereby be inserted. The intra prediction mode of the current block is encoded to a predetermined binary number of a codeword. In the decoding process, when the MPM flag is "1", it can be known that the intra prediction mode of the current block matches MPM. The MPM index is encoded. For example, when the number of MPMs is "4", the MPM index is encoded to a flag of two bits of "00", "01", "10", and "11" indicating the MPM index. Accordingly, in the decoding process, it is possible to decode the encoded intra prediction mode by indicating the encoded flag using a decimal number and thereby employing an MPM index of "0", "1", "2", and "3". In the decoding process, when the MPM flag is "0", it can be known that the intra prediction mode of the current block is different from MPM. In the encoding process, remaining 34 intra prediction modes excluding MPM from 35 (4×4) intra prediction modes of HEVC are classified based on a binary number of a size of five to six bits. Among the classified intra prediction modes, five bits (XXXXX) or six bits (XXXXXX) corresponding to the intra prediction mode number of the current block is transmitted using a bitstream. Therefore, in the decoding process, using a mode number that is obtained by converting, to a decimal number, five to six bits of information encoded using such binary number, it is possible to decode the encoded intra prediction mode.

Intra Prediction Mode Decoding Apparatus

Figure 12:
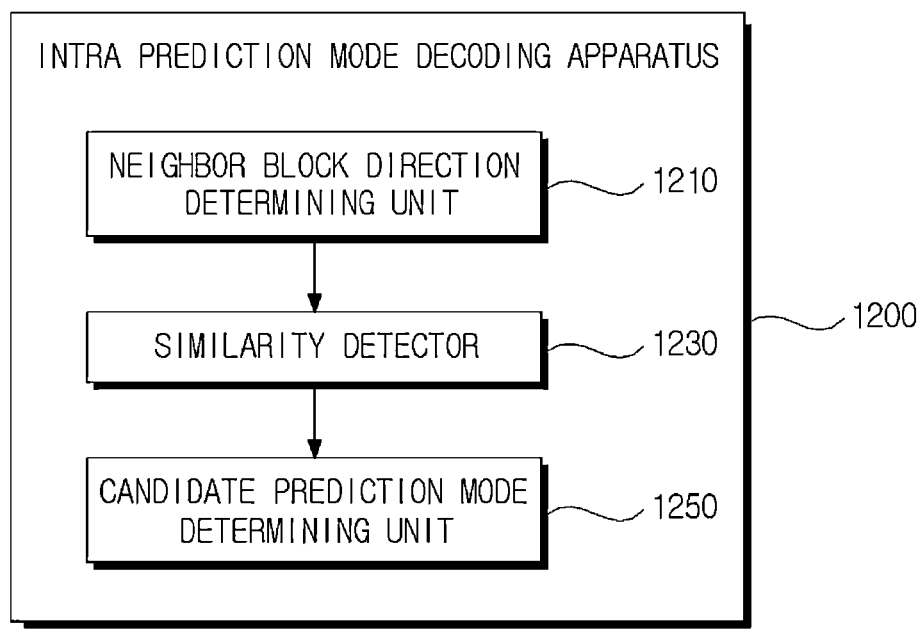
FIG. 12 is a block diagram illustrating an intra prediction mode decoding apparatus according to an exemplary embodiment of the present invention.

FIG. 12 is a block diagram illustrating an intra prediction mode decoding apparatus according to an exemplary embodiment of the present invention.

As illustrated in FIG. 12, an intra prediction mode decoding apparatus 1200 according to an exemplary embodiment of the present invention may include a neighbor block direction determining unit 1210 to determine an intra prediction direction of a neighbor block adjacent to a current block, a similarity detector 1230 to detect a similarity of a prediction direction of the neighbor block with respect to the current block based on a position of the neighbor block and the intra prediction direction of the neighbor block with respect to the current block, and a candidate prediction mode determining unit 1250 to determine a candidate intra prediction mode of the current block based on the similarity and the number of candidate intra prediction modes (N).

A detailed operation of the intra prediction mode decoding apparatus 1200 according to the exemplary embodiment of the present invention follows the aforementioned prediction mode decoding method.

Although a few embodiments of the present invention have been shown and described with reference to the accompanying drawings, it would be appreciated by those skilled in the art that the present invention may be variously corrected and modified without departing from the principles and spirit of the invention, the scope of which is defined by the claims and their equivalents.

What is claimed is:

1. A method for encoding an intra prediction mode of an image, the method comprising:
    detecting a similarity of a prediction direction of a neighbor block with respect to a current block based on a position of the neighbor block and an intra prediction direction of the neighbor block with respect to the current block; and
    determining a candidate prediction mode of the current block based on the similarity and the number of candidate intra prediction modes (N),
    wherein the detecting of the similarity comprises detecting the similarity of the prediction direction of the neighbor block with respect to the current block based on a width of an overlapping area with the current block when extending the neighbor block along the intra prediction direction of the neighbor block from the position of the neighbor block.

2. The method of claim 1, further comprising:
    determining the intra prediction direction of the neighbor block adjacent to the current block.

3. The method of claim 1, wherein the number of candidate intra prediction modes (N) is greater than or equal to "3".

4. The method of claim 1, wherein the neighbor block includes a left block and an upper block based on the current block.

5. The method of claim 1, wherein the neighbor block includes a left block, an upper left block, an upper block, an upper right block, and a lower left block based on the current block.

6. The method of claim 1, wherein:
    the candidate prediction mode includes the number of indices corresponding to the number of candidate intra prediction modes (N), and
    the determining of the candidate prediction mode of the current block allocates a prediction direction of the neighbor block as a lower index among the indices in a descending order of the similarity.

7. The method of claim 4, wherein:
    the number of candidate intra prediction modes (N) is greater than or equal to "3", and
    the determining of the candidate prediction mode of the current block allocates a prediction direction of the neighbor block as a first index and a second index that are lower indices, in a descending order of the similarity, and, after a third index, allocates a direction having a relatively great similarity among neighbor directions having close distances from the first index and the second index.

8. An apparatus for encoding an intra prediction mode of an image, the apparatus comprising:
    a similarity detector to detect a similarity of a prediction direction of a neighbor block with respect to a current block based on a position of the neighbor block and an intra prediction direction of the neighbor block with respect to the current block; and
    a candidate prediction mode determining unit to determine a candidate prediction mode of the current block based on the similarity and the number of candidate intra prediction modes (N),
    wherein the similarity detector detects the similarity of the prediction direction of the neighbor block with respect to the current block based on a width of an overlapping area with the current block when extending the neighbor block along the intra prediction direction of the neighbor block from the position of the neighbor block.

9. The apparatus of claim 8, further comprising:
    a neighbor block direction determining unit to determine the intra prediction direction of the neighbor block adjacent to the current block.

10. The apparatus of claim 8, wherein the number of candidate intra prediction modes (N) is greater than or equal to "3".

11. The apparatus of claim 8, wherein the neighbor block includes a left block and an upper block based on the current block.

12. The apparatus of claim 8, wherein the neighbor block includes a left block, an upper left block, an upper block, an upper right block, and a lower left block based on the current block.

13. The apparatus of claim 8, wherein:
    the candidate prediction mode includes the number of indices corresponding to the number of candidate intra prediction modes (N), and
    the candidate prediction mode determining unit allocates a prediction direction of the neighbor block as a lower index among the indices in a descending order of the similarity.

14. The apparatus of claim 11, wherein:
the number of candidate intra prediction modes (N) is greater than or equal to "3", and
the candidate prediction mode determining unit allocates a prediction direction of the neighbor block as a first index and a second index that are lower indices, in a descending order of the similarity, and, after a third index, allocates a direction having a relatively great similarity among neighbor directions having close distances from the first index and the second index.

15. A method for decoding an intra prediction mode of an image, the method comprising:
detecting a similarity of a prediction direction of a neighbor block with respect to a current block based on a position of the neighbor block and an intra prediction direction of the neighbor block with respect to the current block; and
determining a candidate prediction mode of the current block based on the similarity and the number of candidate intra prediction modes (N),
wherein the detecting of the similarity comprises detecting the similarity of the prediction direction of the neighbor block with respect to the current block based on a width of an overlapping area with the current block when extending the neighbor block along the intra prediction direction of the neighbor block from the position of the neighbor block.

16. An apparatus for decoding an intra prediction mode of an image, the apparatus comprising:
a similarity detector to detect a similarity of a prediction direction of a neighbor block with respect to a current block based on a position of the neighbor block and an intra prediction direction of the neighbor block with respect to the current block; and
a candidate prediction mode determining unit to determine a candidate prediction mode of the current block based on the similarity and the number of candidate intra prediction modes (N),
wherein the similarity detector detects the similarity of the prediction direction of the neighbor block with respect to the current block based on a width of an overlapping area with the current block when extending the neighbor block along the intra prediction direction of the neighbor block from the position of the neighbor block.

* * * * *